United States Patent [19]

Smith

[11] 4,426,040
[45] Jan. 17, 1984

[54] ADJUSTABLE AERATING SHOWER HEAD

[76] Inventor: Lewis L. Smith, 171 Shadywood La., Elk Grove Village, Ill. 60007

[21] Appl. No.: 270,376

[22] Filed: Jun. 4, 1981

[51] Int. Cl.³ .......................... E03C 1/08; E03C 1/084
[52] U.S. Cl. ................................ 239/428.5; 239/499; 239/590.3
[58] Field of Search ............ 239/514, 499, 460, 428.5, 239/587, 504, 548, 590.3

[56] References Cited

U.S. PATENT DOCUMENTS

| 2,510,395 | 6/1950 | Goodrie | 239/428.5 |
| 2,787,452 | 9/1957 | Aghnides | 239/428.5 |
| 2,793,016 | 5/1957 | Aghnides | 239/428.5 |
| 2,974,877 | 3/1961 | Hruby | 239/548 |
| 3,501,064 | 3/1970 | Gaumer | 222/571 |
| 3,617,002 | 11/1971 | Symmons | 239/460 |
| 3,831,860 | 8/1974 | Gullaksen et al. | |
| 3,836,083 | 9/1974 | Bell | 239/460 |
| 4,082,225 | 4/1978 | Haynes | 239/499 |
| 4,273,289 | 6/1981 | Jette | 239/587 |

OTHER PUBLICATIONS

Advertising Brochure Entitled "The Incredible Energy TM Water Savers", by Resources Conservation, Inc.
Advertising Brochure Entitled "Deluxe Shower Saver TM Showerhead", by T.E.S.P., Inc., (Transcontinental Energy Saving Products, Inc.) ©1980.
A Brochure and One-page Advertisement for "Saver Shower" TM by Whedon Products, Inc.
An Advertising Brochure Entitled "Nova Shower Head" by Ecological Water Products, Inc." and a One Page Advertisement Entitled Nova (in the lower right hand corner) and U.s. Pat. No. 3,831,860 (referred to in said advertisements).

Primary Examiner—John J. Love
Assistant Examiner—Jon M. Rastello
Attorney, Agent, or Firm—Howard H. Darbo

[57] ABSTRACT

A water-saving shower head of the aerating type providing water in air-borne atomized form in a normal, continuously expanding pattern substantially homogeneous in cross-section as to water concentration or "wetness" with means for adjusting the rate of flare of the pattern to increase the concentration of water or "wetness" for rinsing purposes, especially for better removal of shampoo from the hair. The adjustment is accomplished by manually adjusting the position of the transverse orificed nozzle plate along the axis of the outlet passageway of the shower head, the longer the passageway, within limits, the more concentrated the shower pattern.

5 Claims, 6 Drawing Figures

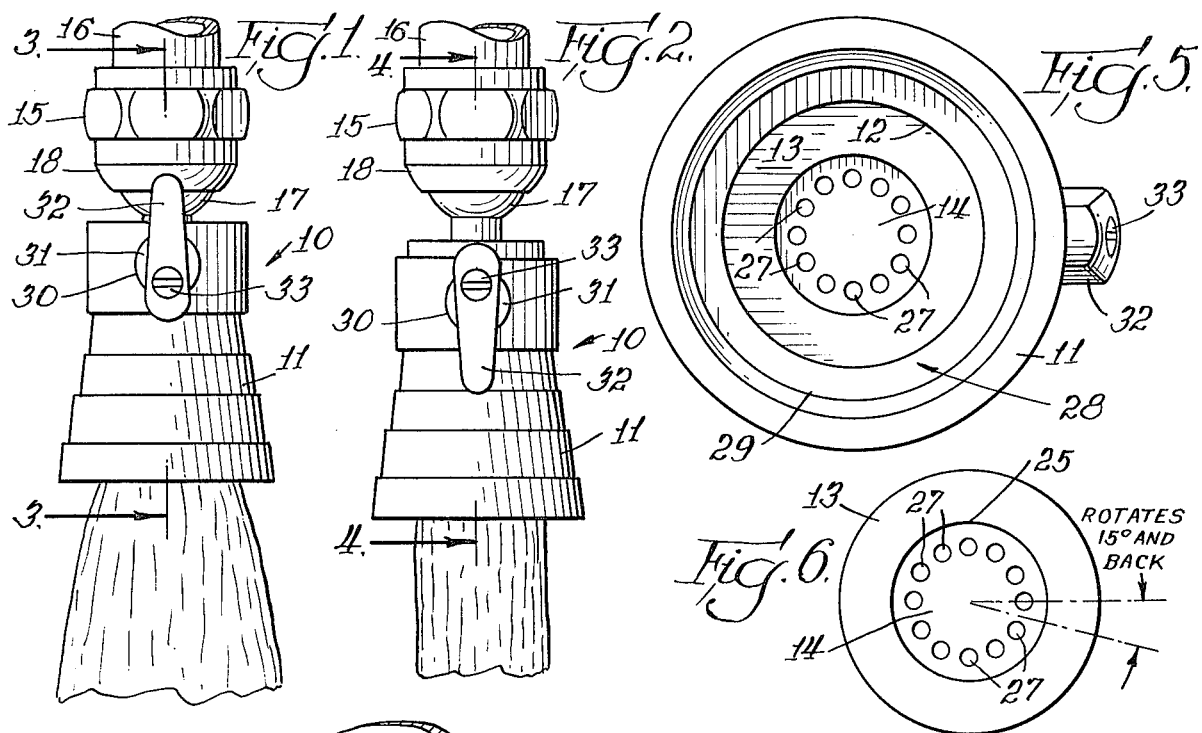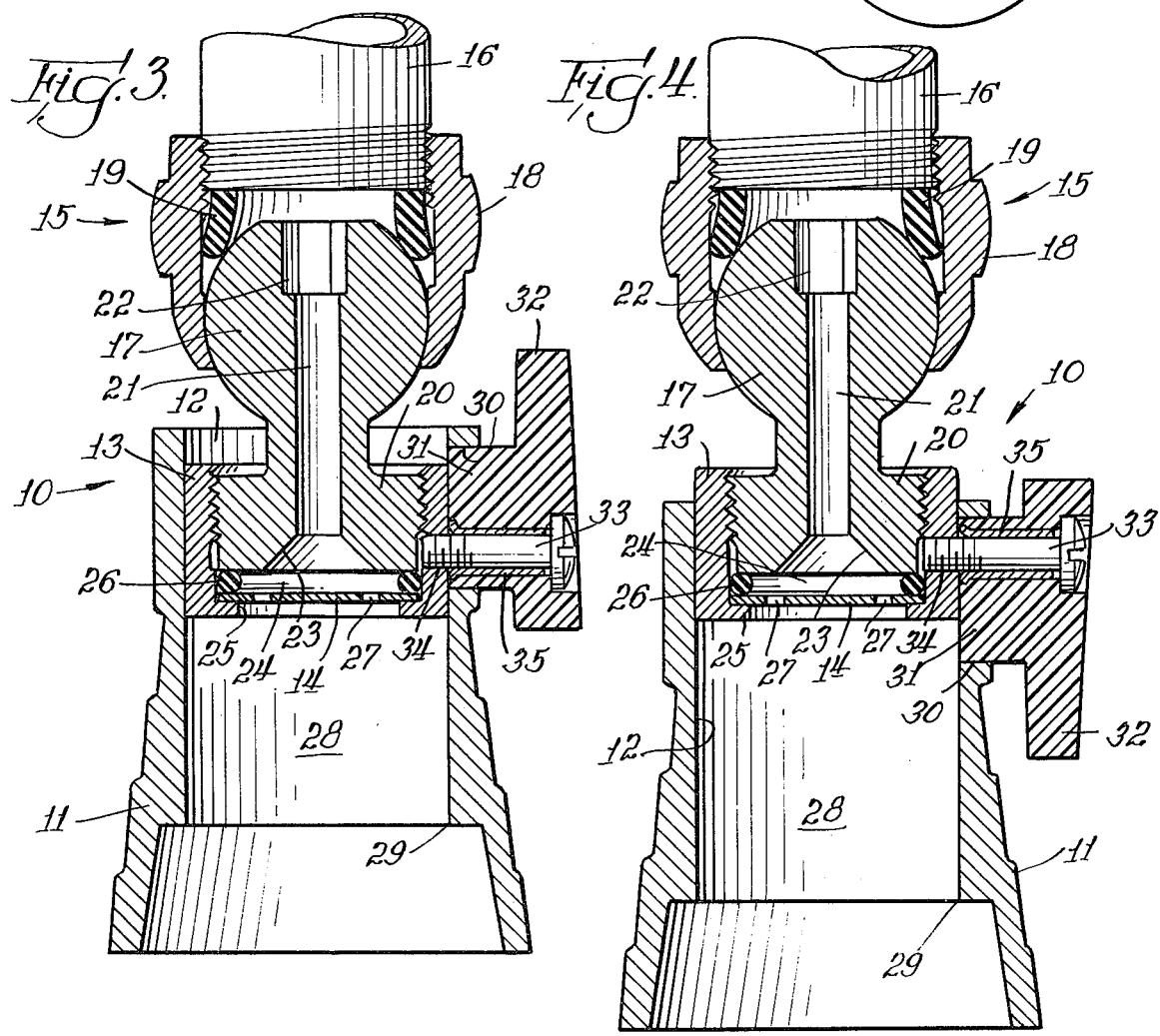

ADJUSTABLE AERATING SHOWER HEAD

BACKGROUND AND SUMMARY OF THE INVENTION

The invention relates to a water-saving aerating shower head which is adjustable to obtain a range of shower patterns differing in water density or "wetness" to limit water output to a minimum having regard to the need for more water for effective rinsing following soaping or the application of shampoo to the hair. While the actual amount of water flowing to and through the shower head remains constant, it has been found that the minimum concentration of water in an aerated shower pattern sufficient for wetting the skin and hair for soaping and washing purposes is inadequate for satisfactory rinsing and that this deficiency of known aerating shower heads can be rectified by narrowing the flow pattern to concentrate the water content and bring to bear adequate rinse water at locations where rinsing has not yet been completed.

A wide variety of shower heads have heretofore been devised and used, ranging from simple sprinkling can type which provides a cluster of small streams of water to complicated and frequently adjustable heads which supply a wide range of shower patterns. While conservation of water, especially hot water, has been an objective in the designing of some of these shower heads, energy shortages and greatly increasing cost of gas, oil and electricity have emphasized the need and wisdom of hot water conservation. Aeration of the water as it is emitted by the shower head nozzle has been a step in the direction of conservation. True and effective aeration requires the aspiration of air at the outlet of the nozzle aperture or orifices although some aeration takes place even in the shower patterns of heads not specifically designed for aeration. Shower heads similar to that of the present invention but lacking any means of adjustment to vary the characteristics of the emitted shower pattern are known. Such heads comprise a body having a more or less conical or flaring outlet passageway extending downstream from a transverse nozzle plate of thin metal having a circular cluster of small orifices through which the water flows in as many jets into the outlet passageway. To some extent, air is aspirated by the several jet streams into at least the downstream portion of the outlet passageway to break up the individual jet streams and effect a degree of atomization. This break-up action is continued to some extent as the water emerges from the shower head. The result is a shower pattern having a fixed rate of flare and water concentration characteristics.

It has been found that the flare pattern of a shower head of this type is determined at least partly by the length of the outlet passageway downstream from the nozzle plate of the shower head. For a given supply water pressure, thickness and orifice pattern of the nozzle plate and rate of flare of the outlet passageway of the shower head, the rate of flare and water concentration of the shower pattern is determined by the length of the outlet passageway downstream from the nozzle plate. It has been found that, within limits, the greater this distance, the smaller the rate of flare of the shower pattern and the greater the concentration of the air-borne atomized water emitted for showering purposes and, per contra, the shorter this distance the greater the rate of flare and therefore area of coverage albeit with lower concentration of water in the shower pattern.

The object of the present invention is to provide a water-saving, aerating shower head which can be adjusted by the user while taking a shower to emit a shower pattern within a range of rates of flare from large with low concentration of atomized water to small, more focused pattern containing a relatively high concentration of water. A further object is to provide such a shower head with a sharp-edged passageway outlet which emits a sharply defined shower pattern of air-borne atomized water with a formation of drops of water which drip to the floor.

A subservient object is to provide an adjusting mechanism which rotates to a limited extent the body of the shower head with respect to the fixed nozzle plate in the course of effecting the desired adjustment to effect the self-cleaning of the narrow space between the nozzle plate assembly and the inside surface of the outlet passageway upstream extended.

In summary, the invention contemplates an aerating shower head comprising a body having a substantially cylindrical passageway therethrough which terminates at its outlet end in a sharp edge and contains within the inlet end of the passageway an axially movable sleeve including the transverse nozzle plate, the axial position of the sleeve being determined by an eccentric mechanism including an externally rotatable portion having an eccentric pin engaging the sleeve.

BRIEF DESCRIPTION OF THE DRAWING

In the accompanying drawing,

FIG. 1 is a side view of the preferred embodiment of the adjustable shower head of this invention, shown with the adjustment handle in position to provide a relatively large flare shower pattern with low water concentration;

FIG. 2 is a side view similar to that of FIG. 1 but showing the adjustment handle in position to provide a narrow flare shower pattern with high water concentration;

FIG. 3 is a cross-sectional view taken at the line 3—3 of FIG. 1;

FIG. 4 is a cross-sectional view taken at the line 4—4 of FIG. 2;

FIG. 5 is a bottom view of the shower head, and

FIG. 6 is a detail view showing the outlet face of the nozzle plate assembly of the shower head to illustrate an optional relative rotational feature of the mechanism.

DESCRIPTION OF EXAMPLES EMBODYING BEST MODE OF THE INVENTION

The shower head 10, shown in the drawing as an example of the invention, comprises a body 11 having a cylindrical passageway 12 therethrough, a cylindrical sleeve 13 slideably arranged in passageway 12 and carrying nozzle plate 14, and means 15 for supporting the shower head and connecting it to water supply pipe 16. The shower head mounting and connecting means includes a ball joint comprising ball 17, threaded swivel ferrule 18 and a ring seal 19 of rubber or similar material. The ring seal extends between and engages the end of supply pipe 16 and the top portion of ball 17 to prevent the escape of water when ferrule 18 is screwed tightly upon the water supply pipe.

The upper portion of the inner cylindrical surface of sleeve 13 is threaded to receive a correspondingly threaded plug 20 provided below the base of ball 17 as an integral part thereof. A passageway 21 extends axially through the ball/plug part, a hexagonal socket 22 being provided in a counterbore at the top or inlet end of passageway 21, the bottom or outlet end of the passageway being flared as at 23 to permit broadening of the stream of water passing through the passageway into the space 24 defined by nozzle plate 14 and the bottom end of plug 20. The nozzle plate rests upon an annular shoulder 25 and is clamped into position when plug 20 is screwed down securely against sealing O-ring 26. The plug may be screwed in tightly and, when necessary, unscrewed by means of an Allen wrench operating in socket 22.

As is seen in FIGS. 3–6, nozzle plate 14 is a thin metal plate having a cluster of small orifices 27 arranged in a circle concentric with the nozzle plate and the axis of passageway 21.

In accordance with the invention, the nozzle plate assembly, including its supporting sleeve 13 and parts secured thereto, is slideable along the cylindrical surface of body passageway 12 or, otherwise stated, the body 11 of the shower head is slideable upon sleeve 13. This relative movement alters the length of outlet passageway 28; that is, the portion of passageway 12 extending downstream from nozzle plate 14 to the outlet end of the passageway at annular shoulder 29.

The mechanism for adjusting the position of the nozzle plate assembly, and thus the length of the outlet passageway 28, is illustrated in cross section detail in FIGS. 3 and 4. It is mounted in a circular opening 30 in the upper part of body 11 of the shower head. A cylindrical boss 31, conveniently of plastic material and having an integral handle 32, is arranged for rotation within opening 30. A pin 33, advantageously in the form of a screw, passes through the boss and handle in a hole placed off center of cylindrical boss 31 and into an opening 34 in sleeve 13. The bolt 33 passes through a brass sleeve 35 which is permanently inserted into the boss structure to serve as a bearing for eccentric rotation thereon of cylindrical boss 31. Opening 34 is threaded to receive the bolt which, when screwed in tightly secures boss 31 into abutting but movable engagement with sleeve 13.

It will be understood that with this arrangement rotation of boss 31 by means of handle 32 results in relative movement between shower head 11 and sleeve 13 as a part of the nozzle plate assembly, resulting in adjustment of the length of the outlet passageway 28 or the shower body. In FIGS. 1 and 3, the nozzle plate is at its lowermost position with corresponding minimum length of the outlet passageway while in FIGS. 2 and 4 the nozzle plate is in its uppermost position with maximum length of the outlet passageway.

In the shower head herein described and illustrated by way of example, the diameter of the cluster circle of orifices 27 in nozzle plate 14 is greater than the diameter of passageway 21 and the diameter of outlet passageway 28 is greater than that of an orifice cluster circle. When the water is turned on, the stream passing through passageway 21 is directed toward the solid central portion of nozzle plate 14 and flows more or less radially to and through the orifices in as many jet streams. This jet stream flow creates a suction immediately downstream from the orifice plate, drawing air into the body 11 through the annular tolerance space between sleeve 13 and passageway 12. Under these conditions, the water is aerated and atomized as the jet streams are emitted from the nozzle plate. The flowing stream of air-borne water in atomized form is guided into a pattern suitable for use in a shower facility, probably by the impingement and latching of the high velocity droplets onto the interior contact surfaces of outlet passageway 28 with subsequent passage from the shower head in a particular flow pattern. For a given water supply pressure in the typical range for household shower facilities (15 PSI to about 60 PSI), a nozzle plate having a particular thickness, size and spacing of orifices, and diameter of outlet passageway 28, the shape and density of the shower pattern depends upon the length of the outlet passageway. The significance of adjustability of this length, accordingly, is that the shower pattern can by this means be controlled to provide a range of rates of flare with inversely corresponding concentrations of water. As indicated in FIGS. 1 and 3, with an outlet passageway adjusted to minimum length, the rate of flare is relatively great and concentration of water at a minimum while with outlet passageway adjusted to maximum length as indicated in FIGS. 2 and 4, the shower pattern is narrower with maximum concentration of water. As already noted, the wider spray pattern, although containing a minimum concentration of water, quickly wets the entire body of a person taking a shower but may be inadequate for rinsing purposes while the more focused pattern indicated in FIG. 2 provides the water in sufficient concentration to rinse away soap and shampoo.

It will be noted that outlet passageway 28 terminates abruptly at its downstream end, annular shoulder 29 being sharp rather than radiused. It has been found that the sharp edge avoids the tendency to "drool" experienced with rounded formation of this shoulder. When the shoulder is rounded or radiused, a demisting appears to take place, larger drops of water accumulating until entrained in the otherwise relatively uniform spray carrying the water in atomized form.

In operating the adjusting mechanism to alter the character of the shower pattern, the eccentric drive boss 31 moves the body 11 with associated passageway 28 not only longitudinally along sleeve 13 but also to a limited extent, about 15 degrees, in rotation as indicated in FIG. 6. This rotational movement, along with the reciprocating movement, is desirable as it tends to self-clean the working parts of the shower head, eliminating lime deposits that may tend to form.

It is to be understood that alternative adjustment mechanisms which are externally manipulable by the user are suitable for use with the invention. For example, nonrotatable levers, arms, or the like, could be employed and simply travel back and forth to effectuate longitudinal movement between sleeve 13 and shower head 11, although without relative rotation therebetween. Further, altenative adjustment means need not necessarily extend through an opening in body 11, but could, by way of example, be mounted at an upper portion of body 11 to cooperate with sleeve 13 at an upper portion of passageway 12. Further, adjustment of passageway 28 could be achieved by a fixed position shower head 11 and a variable position sleeve 13.

In the exemplary embodiment of the shower head herein shown and described, the diameter of passageway 21 is about 0.150 inches, providing a cross-sectional flow area of about 0.018 square inches. The diameter of the cluster circle of orifices 27 is about 0.360 inches. The nozzle plate 14 may have a thickness of about 0.02 inches to about 0.035 inches and the orifices may vary in diameter from about 0.036 to about 0.052 inches. In the example shown, the total area of the sharp-edged orifices 27 is about 0.015 square inches.

Passageway 21 may be flared at about 45 degrees at its outlet end to an opening of about 0.375 inches in diameter.

Shower body passageway 12 has a diameter of about 0.875 inches and the length of outlet passageway 28 is adjustable from about 0.800 inches to about 1.050 inches.

It will be understood that the foregoing specific dimensions are given to complete the description of a specific, and at least presently preferred, embodiment of the invention and that similar shower patterns may be achieved by structures which vary somewhat from that specifically described and shown herein.

ACHIEVEMENT

While many known shower heads offer a variety of adjustments, they have, in general, been limited to merely opening or restricting individual stream flow such that fine or heavy individual streams are emitted in wide or narrow patterns. Water conservation, if considered at all, was secondary in these shower head designs. On the contrary, the shower head of the invention herein shown and described by way of example achieves maximum water conservation commensurate with the provision of a satisfactory shower. The body of the person taking the shower is efficiently wetted by a minimum amount of water at one adjustment position of the shower head while in another adjustment position the shower pattern is more concentrated for the satisfactory rinsing away of soap and shampoo. This two-stage (intermediate positions may also be used if desired) showering procedure minimizes the use of water while providing a satisfactory shower. At normal household water supply pressures of about 30 PSI to about 50 PSI, the rate of flow of water through the shower head herein described is about 2.2 gallons per minute 50 PSI and may be even lower. The water-saving achievement of the two-stage procedure using the adjustable shower head of this invention may be even further improved by using a valve, commonly located immediately upstream from the shower head assembly by which the water may be fully, or almost fully, turned off after the wetting stage, while soaping and scrubbing, and again turned on for the rinsing stage.

I claim:

1. In a showerhead comprising a body having an axial outlet passageway therein, a nozzle plate arranged coaxially and normal to said passageway at the inlet end thereof, said nozzle plate having a cluster circle of orifices therein, and means forming an inlet passageway coaxially with said outlet passageway and upstream of and opening toward said nozzle plate, the diameter of said outlet passageway being greater than the diameter of said cluster circle, the improvement therein comprising a thin walled nozzle plate having sharp-edged orifices each capable of providing a high velocity atomized jet of water emitting therethrough into said outlet passageway; said nozzle plate being held coaxially and normal to said inlet passageway; the total cross-sectional area of said orifices being less than the cross-sectional area of any upstream water passageway, whereby the nozzle plate provides the basic flow restriction; the outlet passageway having a length sufficient to enable a suction to be created immediately downstream from the nozzle plate; and means for drawing air into said outlet passageway immediately downstream of the nozzle plate, whereby to aerate the atomized water jets; said outlet passageway further being of a length sufficient to direct the aerated water into a uniform spray pattern emitting therefrom at an outlet opening thereof having a sharp-edged annular shoulder defining said outlet opening; and externally manipulable means for axially varying the position of said nozzle plate axially relative to said body to correspondingly vary the length of said outlet passageway whereby to vary and control the included angle characteristic of the spray pattern and the water content concentration.

2. An improved shower head as claimed in claim 1 wherein said thin walled nozzle plate has a thickness of less than or equal to 0.035 inches.

3. An improved shower head as claimed in claim 1 wherein said externally manipulable means is movably mounted at an opening in said body and in driving engagement with said outlet passageway.

4. An improved shower head as claimed in claim 3 wherein said externally manipulable means includes a cylindrical boss rotationally movable in said opening and a handle affixed to said boss, said boss being mounted to operate eccentrically to move said outlet passageway axially relative to said nozzle plate.

5. An improved shower head as claimed in claim 4 wherein said means forming an inlet passageway includes a sleeve coaxial with and carrying said nozzle plate, said sleeve being positioned within said movable outlet passageway upstream extended, and wherein said eccentric boss drivingly engages said outlet passageway whereby said externally manipulable boss is capable of varying the relative longitudinal and rotational position of said outlet passageway with respect to said nozzle plate.

* * * * *